United States Patent [19]

Flood et al.

[11] Patent Number: 4,814,379

[45] Date of Patent: Mar. 21, 1989

[54] TOUGHENED, LOW PERMEABILITY, SOLVENT AND SALT RESISTANT POLYAMIDE BLENDS

[75] Inventors: Paul W. Flood, Dublin; John E. Corn, Westerville; Robert J. Schafer, Worthington, all of Ohio

[73] Assignee: Ashland Oil, Inc., Ashland, Ky.

[21] Appl. No.: 179,597

[22] Filed: Apr. 11, 1988

[51] Int. Cl.⁴ .............................................. C08L 77/00
[52] U.S. Cl. ...................................... 525/66; 525/179
[58] Field of Search ................................... 525/66, 179

[56] References Cited

FOREIGN PATENT DOCUMENTS

| 0008246 | 1/1982 | Japan | 525/181 |
|---|---|---|---|
| 0200448 | 12/1982 | Japan | 525/66 |
| 0136345 | 8/1984 | Japan | 525/66 |
| 0136346 | 8/1984 | Japan | 525/66 |
| 1040356 | 2/1986 | Japan | 525/66 |
| 2011766 | 1/1987 | Japan | 525/66 |

*Primary Examiner*—Lewis T. Jacobs
*Assistant Examiner*—A. Carrillo
*Attorney, Agent, or Firm*—John F. Jones

[57] ABSTRACT

Compositions useful as a material for fuel lines comprising an intimate blend of:
(I) from 45 to 55% by weight of a polyamide and
(II) from 55 to 45% by weight of a mixture of
 (a) From 70 to 90% by weight of high density polyethylene grafted with an alpha, beta-olefinically unsaturated dicarboxylic acid anhydride,
 (b) From 5 to 15% by weight of linear low density polyethylene grafted with an alpha, beta-olefinically unsaturated dicarboxylic acid anhydride, and
 (c) From 5 to 15% by weight of ethylene/propylene/diene rubber grafted with an alpha, beta-olefinically unsaturated dicarboxylic acid anhydride
are described.

6 Claims, No Drawings

TOUGHENED, LOW PERMEABILITY, SOLVENT AND SALT RESISTANT POLYAMIDE BLENDS

This invention relates to blends of (I) a polyamide with (II) a mixture of (a) high density polyethylene (HDPE), (b) linear low density polyethylene (LLDPE) and (c) EPDM rubber, the components of said mixture (II) having been grafted with maleic anhydride prior to blending with said polyamide, said blends possessing the advantageous properties of salt resistance, toughness even at low temperatures, fuel resistance, and the like. All of which properties are requisites for an automotive fuel line material of construction.

U.S. Pat. No. 4,174,385 to Epstein describes toughened multiphase thermoplastic compositions composed of from 60–99% by weight of a polyamide matrix and from 1 to 40% by weight of another polymer which other polymer can be one or more of a variety of specified materials and said other polymer must have at least 20% by weight of a soft rubbery material in it. The compositions of Epstein are said to possess outstanding combinations of properties, foremost of which is outstanding toughness. This outstanding toughness is said to produce greater ductility, less sensitivity to scratches and molded in notches, and vastly reduced susceptibility to catastrophic failure when compared with previously known compositions used in the formation of molded parts.

The use of alpha, beta-olefinically unsaturated carboxylic acids or anhydrides, such as maleic anhydride, to modify polyethylene in combination with a soft, rubbery material grafted with maleic anhydride to toughen nylon 6 and/or nylon 66 is disclosed in Japanese Kokai Tokkyo Koho JP No. 82,08,246. Similarly, Japanese Kokai Tokkyo Koho JP Nos. 84,122,545 and 84,122,546 disclose the use of polyethylene of high crystallinity in combination with a rubbery material wherein either the polyethylene or the soft rubbery material are grafted with maleic anhydride to toughen the nylon and make it more resistant to water.

We have found that simple combinations of polyethylene grafted with maleic anhydride and rubbery material or a rubbery material grafted with maleic anhydride in combination with nylon 6 and/or nylon 66 are not sufficiently resistant to attack by either salt water or sour fuel to enable them to be used in the formation of fuel lines. We have found that such blends wherein the nylon matrix content is about 55% or more by weight of the blend lose their resistance to salt water after exposure to heat, for instance during the fuel hose shaping process or during use in the engine compartment of an auto, and that the compositions according to our invention can be used in the formation of fuel lines and that the resulting fuel lines are resistant to salt water and sour fuel even after being heated in the formation process and during their use in the engine compartment of a motor vehicle.

A particularly good composition in accordance with our invention is a blend of (I) from 45 to 55% by weight of nylon 6 with (II) from 55 to 45% by weight of a mixture of (a) from 70 to 90% by weight of high density polyethylene (HDPE) grafted with maleic anhydride, (b) from 5 to 15% by weight of linear low density polyethylene (LLDPE) grafted with maleic anhydride and (c) from 5 to 15% by weight of ethylene/propylene/diene monomer (EPDM) rubber grafted with maleic anhydride.

The term EPDM as used herein refers to copolymers of ethylene, propylene and at least one nonconjugated diene. These copolymers are conveniently prepared by copolymerizing the monomers in the presence of a coordination catalyst system such as diisobutyl aluminum chloride and vanadium oxytrichloride. Copolymerization may be conducted in an inert solvent or in a slurry or particle form reactor. Details of their preparation are given, for instance, in U.S. Pat. Nos. 2,933,480; 2,962,451; 3,000,866; 3,093,620; 3,093,621; 3,063,973; 3,147,230; 3,154,528; 3,260,708 and M. Sittig, "Stereo Rubber and Other Elastomer Processes" Noyes Development Corporation, Parak Ride, N.J. 1967. Ethylene-propylene rubbers are well known and are also often used in applications in which EPDM copolymers are used.

An especially preferred class of EPDM is that in which the nonconjugated diene is monoreactive. Monoreactive nonconjugated dienes have one double bond which readily enters the copolymerization reaction with ethylene and propylene and a second double bond which does not, to any appreciable extent, enter the copolymerization reaction. Copolymers of this class have maximum side chain unsaturation for a given diene content, which unsaturation is available for adduct formation. Monoreactive dienes which can be selected in preparing the preferred class of EPDM copolymers include linear aliphatic dienes of at least six carbon atoms which have one terminal double bond and one internal double bond, and cyclic dienes wherein one or both of the carbon-to-carbon double bonds are part of a carbocyclic ring.

Cyclic dienes useful in the preparation of the preferred class of EPDM copolymers for use in this invention include alkylidene bicycloalkenes, alkenyl bicycloalkenes, bicycloalkadienes and alkenyl cycloalkenes. Representative of alkylidene bicycloalkenes are 5-alkylidene-2-norbornene such as 5-ethylidene-2-norbornene and 5-(1'-propenyl)-2-norbornene. Dicyclopentadiene and 5-ethyl-2,5-norbornadiene are illustrative of bicycloalkadienes and vinyl cyclohexene is representative of alkenyl cycloalkenes which may be selected as the diene monomer.

LLDPE (linear, low density polyethylene) polymers useful in the practice of this invention are those produced by copolymerizing ethylene with an alpha-olefin selected from the group consisting of butene-1, hexene-1, 4-methylpentene-1 and octene-1 and preferably butene-1 and octene-1 at a ratio of from about 3 to 14% by weight based on the weight of the polymer in the presence of a chromium catalyst or Zeigler catalyst by the gas phase method, liquid phase method, or solution method.

Polyamides useful in the practice of the present invention include those produced by the condensation of equimolar amounts of a saturated dicarboxylic acid containing from 4 to 12 carbon atoms with a diamine, in which the diamine contains from 4 to 14 carbon atoms and particularly include those prepared by ring opening polymerization of lactams. Polyamides useful in this invention include polyhexamethylene adipamide (nylon 66), polyhexamethylene azelamide (nylon 69), polyhexamethylene sebacamide (nylon 610) and polyhexamethylene dodecanoamide (nylon 612). Most preferred for the purposes of the present invention, however, are the polyamides produced by the ring opening polymerization of lactams and these preferred polyamides include polycaprolactam (nylon 6), polylauric lactam, poly-11- aminodecanoic acid, and the like. Most preferred for the purposes of the present invention is nylon 6 (polycaprolactam) because of the superior properties it imparts to the final polymeric composition embodied in this invention and because it is readily available and relatively inexpensive. It is also preferred that the polyamide used in this invention be substantially free of manganese or phosphorus ions (less than about 1 PPM of either).

It is convenient to mix the non-nylon phase and graft maleic anhydride onto the mixture although the grafting can be done on the individual components of the mixture, if desired. It is preferred that the amount of maleic anhydride grafted onto the non-nylon phase (II) be in the order of from about 0.2 to 0.25% by weight. The exact level of grafting of maleic anhydride onto the non-nylon phase (II) can be measured after the non-grafted maleic anhydride is leached from the non-nylon mixture or individual components.

Nylon 11 and 12 have many applications that require excellent toughness, solvent resistance and/or low permeability but these resins are expensive because of the raw materials used to produce them and their manufacturing processing costs. Fuel line hose is a typical example of a use for nylon 11 and 12.

Fuel line hose to be useful must be:
1. Resistant to road salts.
2. Tough to at least −40 degrees F.
3. Resistant to degradation by fuels including sour and/or alcohol-containing fuels.
4. Formable into tubing and shapeable using hot forming processes.
5. Strong enough to prevent bursting from internal pressure.
6. Of low permeability to fuel.
7. Bendable without kinking.
8. Resistant to atmospheric and heat degradation.
9. Dimensionally stable in the presence of moisture.

Toughened nylon 6 and 66 meet many of the above criteria for fuel lines and are relatively inexpensive but they have little resistance to road salt. For instance, Epstein (U.S. Pat. No. 4,174,358) discloses the toughening of nylon at levels of nylon of 60% by weight and greater. This patent also states that at least 20% by weight of soft rubbery material in a phase other than nylon is needed for toughening. Such blends are not resistant to road salt. In addition, we have found that levels of rubbery material much less than 20% by weight in an other than nylon phase are adequate for toughening our blends. Using lowest possible levels of rubbery material in blends for fuel line use we have found increases the resistance of the resulting blend to fuels and increases the impermeability of the blends to fuels.

In accordance with this invention high density polyethylene (HDPE), linear low density polyethylene (LLDPE) and EPDM rubber may be conveniently mixed in a melt mixer at a 35/5/5 weight ratio with about 0.45 parts per hundred (pph) of maleic anhydride (MAH) and 0.1 pph of benzoyl peroxide at about 250-280 degrees C. to produce a blend which contains 0.2 to 0.25% by weight of grafted MAH. The graft level of maleic anhydride can be measured after leaching out ungrafted maleic anhydride from the grafted blend. Fifty parts by weight of the grafted blend is then intimately mixed with 50 parts by weight of a lubricated nylon 6 in a melt mixer. The resulting blend meets all of the requirements for a fuel line (Ford Motor Co. specifications). The compositions of this invention may also be prepared in one pass in a twin screw extruder by grafting in the first part of the extruder and blending the grafted material with the nylon in the downstream part of the extruder. Thus, it is generally advantageous to make a mixture of the HDPE, LLDPE and EPDM rubber and graft all three materials simultaneously with maleic anhydride, but this is not necessary. Good results are obtained by grafting each of the three of the components individually with MAH before mixing them.

The grafting of the HDPE, LLDPE and EPDM can be done with other alpha, beta olefinically unsaturated dicarboxylic acid anhydrides, such as methyl nadic anhydride and the like, wholly or as partial replacements for some of the maleic anhydride. In the grafting step peroxides other than benzoyl peroxide can be used as would be apparent to those skilled in the art.

The inclusion of stabilizers, fillers, colorants, reinforcement agents, and the like types of materials known to and ordinarily employed by those skilled in the art in the compositions of this invention is within the scope of the present invention.

In order to obtain the properties required for a fuel line hose in the compositions of the present invention we have found it necessary that the nylon content of the composition contain no more than about 55% by weight of nylon and on the other hand, the nylon must be present in sufficient amount (about 45% by weight) to provide a good barrier resistance to the passage of fuel.

The level in the combined mixture of grafted HDPE, LLDPE and EPDM in the combined mixture is preferable about 55% to 45% by weight in order to produce a blend which is most resistant to fuel.

This invention is further illustrated in the following representative examples.

EXAMPLE 1

(A) A blend of three polymers was prepared and grafted with maleic anhydride first by charging the dry polymer blend in a dry blending unit. The dry polymer blend was composed of 77.78% by weight of high density polyethylene (HDPE, LS556 from USI), 11.11% by weight of linear low density polyethylene (LLDPE, Dowlex 2517, a copolymer of ethylene and octene-1 containing about 12% by weight of octene-1 from Dow Chemical Co.) and 11.11% of ethylene propylene diene rubber (EPDM, IM7200 from Uniroyal Chemical which contains ethylene, propylene and 5-ethyl-2,5-norbornadiene). A solution of 0.1 parts by weight of benzoyl peroxide and 0.5 parts by weight of maleic anhydride was prepared in ethyl acetate (using from about 2 to 4 times the weight of the maleic anhydride of ethyl acetate to form the solution). Other solvents such as acetone may also be used. This solution was then blended with 100 parts by weight of the above-described polymer blend and the resulting mixture was further blended for from about 20 to 30 minutes at ambient temperature so as to achieve a well dispersed mixture of polymers and grafting chemicals. Following the blending of the polymers and chemicals the resulting mixture was transferred to a metering device (such as a K-Tron feeder) and was fed into a twin screw extruder (e.g. a ZSK 30 from Werner & Pfleider). The extruder was equipped with fourteen 3:1 L/D barrel sections which barrels were heated to a temperature in the range of from 140 to 250 degrees C. The screw speed of the extruder was set at 200 RPM. Although much of the ethyl acetate solvent was flashed off either during the blending or in the feeder charging steps, the extruder was equipped with a vacuum vent port through which any remaining volatiles could be vented from the mixture. The resulting molten resin, which was essentially solvent free, was extruded through a strand die, the strand was cooled in a water bath as it exited the extruder die and the strands were chopped in a pelletizer into the form of pellets. Graft blends prepared in this manner were found to contain about 0.25% by weight of grafted maleic anhydride. Care was taken to minimize the exposure of the strands to water in order to avoid excessive moisture in the strands and the possible need for drying of the pellets.

(B) A mixture of 49.875 parts by weight of dry pellets prepared according to procedure (A) above, 49.875 parts by weight of nylon 6 (Capron 8200 from Allied-Signal Co. containing less than about 1 PPM of either manganese or phosphorus ions) and 0.250 parts by weight of stabilizer (Naugard XL 311 from Uniroyal Chemical Co.), which is a 1:1 blend of 2,2'-oxamido bis [ethyl 6-3-(3,5-di-e-butyl-4-hydroxyphenyl) propionate] and 1,3.5-trimethyl-2,4,6-tris (3,5-di-5-butyl-4-hydroxybenzyl) benzene, and the resulting mixture was blended in a dry blender for about 20 to 30 minutes at ambient temperature to achieve a well dispersed mixture of resins and chemicals. Following this blending step the resulting mixture was transferred to a metering device (such as a K-Tron feeder) and was fed into a twin screw extruder (ZSK 30 from Werner & Pfleider). The extruder was equipped with fourteen 3:1 L/D barrel sections and the barrels were heated to a temperature in the range of 180 to 260 degrees C. The screw speed was set at 200 RPM. Strands were prepared as in (A) and chopped into pellets. Again care was used to minimize the exposure of the strands to water.

The thermoplastic pellets produced can be readily shaped and formed into a variety of shapes and sizes by thermoplastic molding and forming operation well known to those skilled in the art. Injection molded test samples prepared from the thermoplastic pellets from (B) of this example were tested and found to have the following properties.

| TEST EMPLOYED | RESULTS |
| --- | --- |
| Tensile Strength - Yield (psi) | 4800 |
| Tensile Strength - Break (psi) | 4600 |
| Tensile Elongation - Yield (psi) | 10 |
| Tensile Elongation - Break (psi) | 200 |
| Flexural Strength (psi) | 4800 |
| Flexural Modulus (psi) | 120000 |
| Notched Izod (ft-lbs/in) | *NB |
| Gardner Impact @ R.T. (in-lbs) | 320 |
| Gardner Impact @ −40 deg. C. (in-lbs) | 200 |

| TEST EMPLOYED | RESULTS |
| --- | --- |
| Resistance to Auto-Oxidized Fuel | **Passed Test |

*No break
**Ford Motor Co. Test A6 Plastic Fuel Line Test No. ES-E8AC-9327-AA. Test Fuel FLTM A25-1, peroxide Level of 90.

Molded bars from the pellets according to (B) of this example were subjected to a zinc chloride stress cracking test (modified ASTM D1693). In this test the ASTM geometries for the specimens and for the holder as used in the ASTM test were used but the solution used was an aqueous solution of 50% by weight of zinc chloride. The test was conducted for a period of 200 hours and samples were checked for cracking. The molded bars from the material described in this example (B) passed the test (i.e., no cracking was observed in the samples at the end of the test).

EXAMPLE 2

A repeat of Example 1 using 55 parts by weight of (A) and 45 parts by weight of nylon-6 in (B) gave comparable results.

EXAMPLE 3

A repeat of Example 1 using 45 parts by weight of (A) and 55 parts by weight of nylon-6 in (B) gave comparable results.

We claim:
1. A tough, salt resistant, fuel resistant composition comprising an intimate blend of:
 (I) From 45 to 55% by weight of a polyamide and
 (II) From 55 to 45% by weight of a mixture of
  (a) From 70 to 90% by weight of high density polyethylene grafted with an alpha, beta-olefinically unsaturated dicarboxylic acid anhydride,
  (b) From 5 to 15% by weight of linear low density polyethylene grafted with an alpha, beta-olefinically unsaturated dicarboxylic acid anhydride and
  (c) From 5 to 15% by weight of ethylene/propylene/diene rubber grafted with an alpha, beta-olefinically unsaturated dicarboxylic acid anhydride.
2. The composition of claim 1 wherein the polyamide is nylon 6.
3. The composition of claim 2 wherein the alpha, beta olefinically unsaturated dicarboxylic acid anhydride is maleic anhydride.
4. The composition of claim 3 wherein the linear low density polyethylene is a copolymer of ethylene and an alpha-olefin selected from the group consisting of butene-1, hexene-1, 4-methyl pentene-1, and octene-1.
5. The composition of claim 4 wherein the ethylene-propylene/diene rubber is a copolymer of ethylene, propylene and a diene selected from the group consisting of alkylidene bicycloalkenes, alkenyl bicycloalkenes, bicycloalkadienes and alkenyl cycloalkenes.
6. The composition of claim 5 wherein the nylon is substantially free of manganese and phosphorus ions.

* * * * *